No. 789,720.  Patented May 16, 1905.

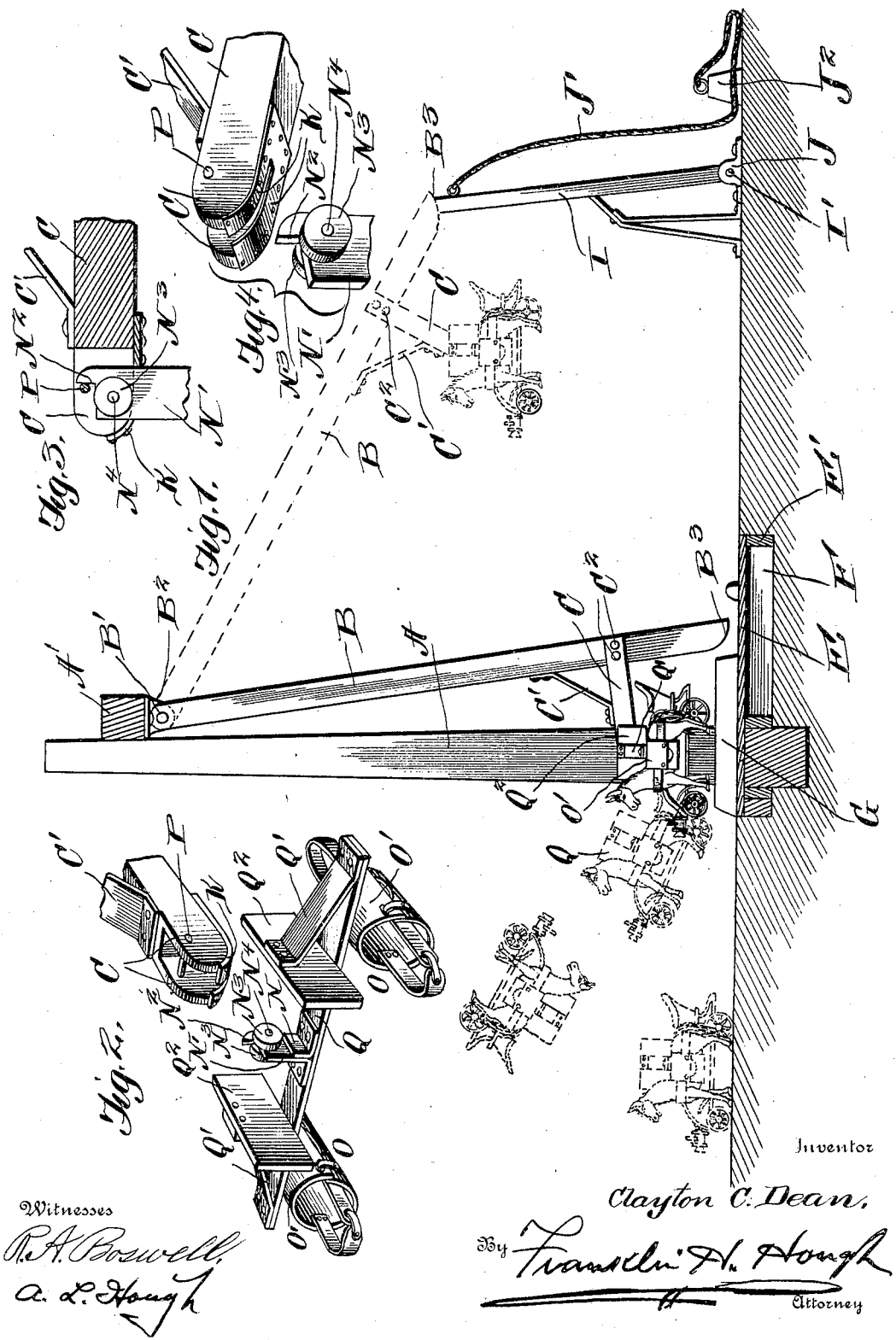

UNITED STATES PATENT OFFICE.

CLAYTON C. DEAN, OF IVANHOE, ILLINOIS.

MACHINE FOR TURNING SOMERSAULTS.

SPECIFICATION forming part of Letters Patent No. 789,720, dated May 16, 1905.

Application filed February 10, 1905. Serial No. 245,121.

*To all whom it may concern:*

Be it known that I, CLAYTON C. DEAN, a citizen of the United States, residing at Ivanhoe, in the county of Lake and State of Illinois, have invented certain new and useful Improvements in Machines for Turning Somersaults; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in mechanical apparatus for causing objects to turn somersaults, and comprises a swinging beam which is pivoted at its upper end and is adapted to hold the object which is to turn the somersault upon a prop which when removed will allow the beam to swing down to a substantially perpendicular position and stopping gradually to allow the mechanism and the object carried thereby to make a complete turn or somersault before striking the ground or floor.

The invention consists, further, in various details of construction and in combinations and arrangements of parts, which will be hereinafter fully described and then specifically defined in the appended claims.

My invention is illustrated in the accompanying drawings, which, with the letters of reference marked thereon, form a part of this application, and in which drawings—

Figure 1 is a side elevation of my apparatus shown as adjusted for use. Fig. 2 is an enlarged detail perspective view showing the apparatus which is attached to the object or objects to which it is desired to impart a movement to cause the same to turn a somersault. Fig. 3 is an enlarged detail view showing the manner in which the swinging bar engages the apparatus which is fastened to the object to be turned, and Fig. 4 is an enlarged detail view showing the parts illustrated in Fig. 2 disconnected.

Reference now being had to the details of the drawings by letter, A designates poles, one of which is shown in the drawings, and which support a cross-piece A'.

B designates a swinging beam, which is pivotally mounted at B' upon a pin or bolt carried by ears B$^2$, mounted upon the cross-piece A'. The free end of said beam is rounded off, as at B$^3$, and C C designate delivery-bars, the ends of which are shown clearly in Fig. 4 of the drawings, which bars are securely fastened, by means of bolts C$^2$, upon the beam B and securely braced by the bar C'.

E designates a platform which is mounted upon the strips E', which are countersunk in a recess F in the ground or floor of a building, and G designates a raised portion of the platform, against the edge of which the rounded portion B$^3$ of the beam B is adapted to contact to limit its throw in one direction.

In the drawings I have shown my device as applied to apparatus for causing a team of horses and an automobile to turn somersaults, and in which apparatus a harness O is provided, which is securely strapped about the animals in any suitable manner in order to securely hold said apparatus to the animals, and to the saddle O' of the harness is secured a spring-board Q, which is braced by strips Q' on either side thereof, the upper ends of the strips Q' being fastened to the plates Q$^2$, which are upon edge, and which plates Q$^2$ are provided for the purpose of protecting the animals in the event of the horses and automobile striking upside down, which would be a remote contingency under ordinary conditions if the apparatus is properly operated. Fixed to said spring-board Q are the angled plates N and N', the lower flanged portions of which are bolted securely to said board, and the shank portions of the plates are fastened together in any suitable manner. The upper end of the plate N' is recessed away, as at N$^2$, forming a right-angled notch, as clearly shown in the enlarged view Fig. 4 of the drawings. Antifriction-wheels N$^3$ are mounted upon a pin N$^4$, which passes through the upper portion of the plate N', said antifriction-rollers being adapted to ride upon the curved plates K, which are fastened to the ends of the bars C, as shown clearly in Figs. 3 and 4 of the drawings. Said plates K, it will be observed, are spaced apart, allowing a sufficient space for the plate N' to move freely therein. A pin P passes through the two strips C and is adapted to contact with the edge of said notch $N^2$ to limit the swinging movement of the apparatus which carries the horses and automobile.

I designates a prop pivotally mounted at I' upon the plate J, and J' is a rope with a counterbalanced weight $J^2$ secured thereto.

In operation the spring-board and harness fastened thereto being first adjusted to the seat of the automobile and to the horses, respectively, the swinging beam is raised to the position shown in Fig. 1 of the drawings and held in such position by means of the prop I. When it is ready to operate the apparatus, the prop is suddenly removed by throwing the weight, which will cause the prop to spring from under the beam B, and the heavy weight of the automobile, with the horses, will cause the beam to quickly fall by gravity to the position shown by solid lines in Fig. 1. Said beam suddenly coming to a standstill, the momentum imparted to the animals and automobile will cause the antifriction-rollers $N^3$ to roll upon the concaved upper surfaces of the plates K, said plate N' being prevented from leaving the plates K by means of the pin P. As the wheels $N^3$ reach the extreme outer ends of the curved plates K the heavy weight of the horses and the automobile will be given an upward throw, causing the animals and the automobile to turn a complete somersault and landing right-side up, in the manner shown in Fig. 1 of the drawings.

In the event of the apparatus, which is secured to the automobile and to the saddles of the harnesses, landing upside down the weight coming upon the plates $Q^2$ will break the force of the fall, as will be readily understood.

Having thus fully described my invention, what I claim as new, and desire to secure by Letters Patent, is—

1. A mechanical apparatus for causing an object to turn a somersault comprising a swinging beam pivoted at its upper end, a stop to limit the throw of said beam in one direction, means for supporting the free end of said beam, delivery-bars secured to said beam, a pin carried by said bars, curved tracks spaced apart and fastened to said bars, a spring-board, plates secured thereto, one of which is notched, antifriction-wheels carried by said notched plate, the shank portion of said notched plate adapted to enter the space between said curved tracks upon the delivery-bars and said antifriction-wheels adapted to travel upon the concaved portions of said tracks, and means for fastening an object to said spring-board, as set forth.

2. A mechanical apparatus for causing an object to turn a somersault comprising a swinging beam pivoted at its upper end, a stop to limit the throw of said beam in one direction, means for supporting the free end of said beam, delivery-bars secured to said beam, a pin carried by said bars, curved tracks spaced apart and fastened to said bars, a spring-board, plates secured thereto, one of which is notched, antifriction-wheels carried by said notched plate, the shank portion of said notched plate adapted to enter the space between said curved tracks upon the delivery-bars and said antifriction-wheels adapted to travel upon the concaved portions of said tracks, means for fastening an object to said spring-board, and plates fixed to one face of said spring-board and securely braced and designed to break the force of the fall of the object in the event of the same landing upside down, as set forth.

3. A mechanical apparatus for causing an object to turn a somersault comprising a swinging beam pivoted at its upper end, a stop to limit the throw of said beam in one direction, means for supporting the free end of said beam, delivery-bars secured to said beam, a pin carried by said bars, curved tracks spaced apart and fastened to said bars, a spring-board, plates secured thereto, one of which is notched, antifriction-wheels carried by said notched plate, the shank portion of said notched plate adapted to enter the space between said curved tracks upon the delivery-bars and said antifriction-wheels adapted to travel upon the concaved portions of said tracks, and harness apparatus secured to said spring-board, as set forth.

In testimony whereof I hereunto affix my signature in presence of two witnesses.

CLAYTON C. DEAN.

Witnesses:
RUTH D. WELLS,
ELLA SMITH.